March 17, 1942.     H. R. ANSEL     2,276,640
ANTISKID DEVICE
Filed Dec. 27, 1938
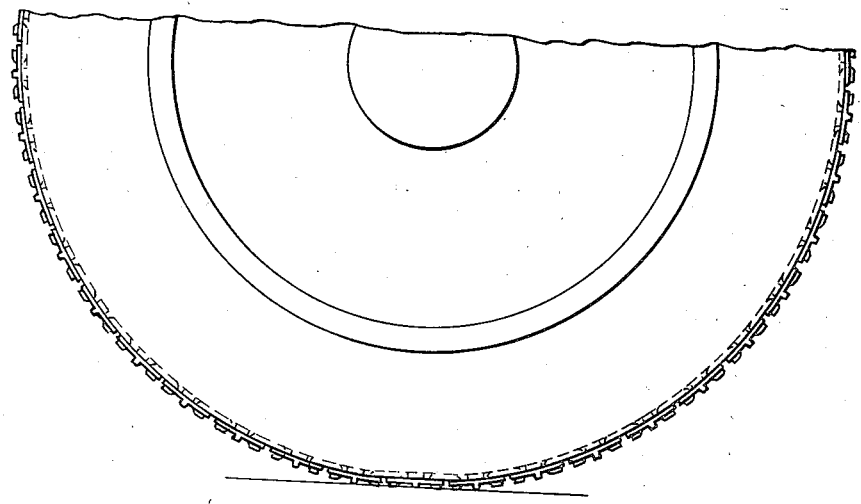
Fig.1.
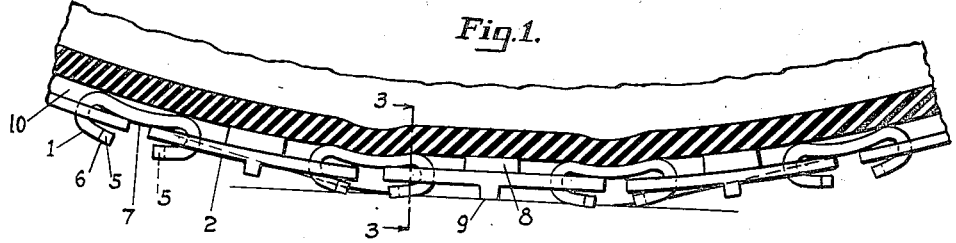
Fig.2.
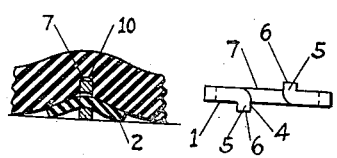   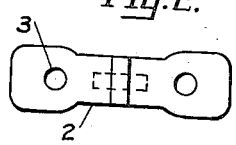   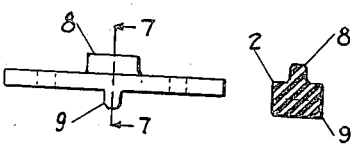
Fig.3.   Fig.4.   Fig.5.   Fig.6.   Fig.7.
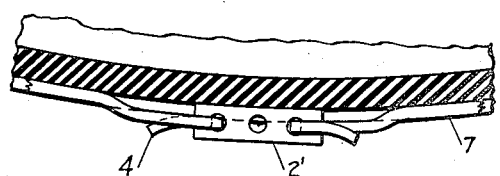
Fig.8.
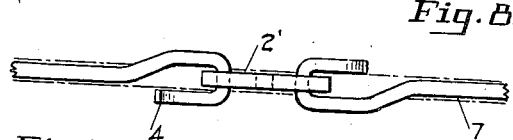
Fig.9.
INVENTOR.
HARRY R. ANSEL
BY
*W. A. Babcock*
ATTORNEY.

Patented Mar. 17, 1942

2,276,640

UNITED STATES PATENT OFFICE 2,276,640

ANTISKID DEVICE

Harry R. Ansel, Cleveland, Ohio

Application December 27, 1938, Serial No. 247,803

3 Claims. (Cl. 152—208)

The present invention relates to anti-skid devices.

It has been common practice for many years to provide chains, grips and cleats of a wide variety for auto tires and to mold the tread surfaces in a wide variety of designs, all with the purpose of adequately protecting against slipping or skidding or wheel spinning on ice coated, wet, greasy or otherwise slippery surfaces. Such attempts have had varying degrees of success in proportion to their effectiveness or respective efficiencies. Since none of them has had a very high degree of efficiency, none have been very successful. In all cases in which a metal device has been used and the whole or greater part of the length of it has been so disposed as to lie between the tire and road and receive the full wheel load in engagement with the road surface at every turn of the wheel, the rapid wear has made them impractical because of short life. The majority of such devices are tire chains. These chains, as is well known, in addition to being very short lived are of considerable thickness and cause sharp bumping and rough riding. This bumping or jarring is emphasized in slow driving on hard surfaces.

The main objects of the present invention are to provide an anti-skid device which will lie dormant and inoperative and practically unworn on the tire throughout the use of the automobile, except when its use is needed, yet will infallibly, instantly, automatically come into full effective operation upon arising of the need. It will be ever present yet out of use and practically unworn at all times except when needed, and only the existence of the need will put it in operation. On ice covered surfaces, or surfaces covered with hard packed snow, for instance, skidding or wheel spinning should be prevented at the very inception. So, the present invention acts automatically, instantly biting into the surface at the first tendency to spin or to skid. The very start of the skid or spin actuates the device.

Other objects of the invention are to provide a simple, efficient, durable, anti-skid device which may be made in quantity at a minimum cost, one which may be quickly and easily applied, removed or renewed and one in which any one or more of the small parts or sections may be removed or renewed with the least possible time, trouble and expense and without renewal of any other part; a device which is durable and compact and will require no modification in the least degree of any treads to which it may be applied, and one which will cause no bumping or roughness in riding.

In order to more clearly disclose the construction, operation and use of the invention, reference should be had to the accompanying drawing forming part of the present application. Throughout the several figures of the drawing, like reference characters designate the same parts in the different views.

In the drawing:

Fig. 1 is a side elevation of a part of a wheel and tire, partly broken away, showing a preferred form of the invention, applied;

Fig. 2 is an enlarged circumferential cross sectional view along part of a tire groove including the easement curve and showing the invention applied, in side view;

Fig. 3 is a fragmentary lateral cross section on line 3—3 of Fig. 2, looking in the direction of the arrow;

Fig. 4 is a top plan view of one of the steel links;

Fig. 5 is a top plan view of one of the rubber links;

Fig. 6 is a side elevation of Fig. 5;

Fig. 7 is a cross section of Fig. 6, on line 7—7, looking in the direction of the arrows;

Fig. 8 is a circumferential cross section, generally similar to Fig. 2, showing a modification; and, Fig. 9 is a plan view of the links of Fig. 8 with the tire groove indicated in dotted lines.

While there are many year-round occassions for the use of anti-skid devices, it is hardly necessary to add that winter is the season most constantly requiring them. With a sheet of hard smooth ice or equally slippery hard packed snow, preventative devices must act instantly, positively and efficiently. And only automatic action can be reliably quick enough.

The simplest and most effective automatic operation is through cooperation of the tire surface and road surface. A device actuated by any change in relation of those surfaces due to skidding, braking or the like, should operate, always at the right time and as a preventative against the dangers of skidding and spinning.

Most standard pneumatic tires of today are provided with one or more circumferential grooves or channels in their treads or traction surfaces. Those that do not have them may easily be provided with them. By means of these grooves, the device of the present invention may be easily and economically applied to and removed from a tire and, as will later appear, instantly automatically rendered operative or inoperative, as the need for it arises or passes.

The hair on a dog's back lies from head to tail. If you stroke the dog in that direction, the hair lies smooth and flat. If you stroke reversely, the hair is thrown out and stands up vertically at right angles to the dog's back. That principle is applied to the present invention in such a way that regular normal relation of the wheel permits the invention to lie inactive or remain inoperative, whereas skidding or spinning of the wheel instantly actuates the device to gripping, holding or operative position. And, as soon as the skidding or spinning stops, the gripping elements are withdrawn to inoperative position. They are, in effect, retractile claws in the same sense as cat's claws are retractile. They are thrust out or projected for use and drawn in or retracted when there is no further use for them.

Referring to the drawing in detail, a plurality of gripping elements or open links 1 of flat resilient or spring steel are used. The over all length of these links is about 2" each. As will later appear, it has been found that an appreciably greater length will not work acceptably with the present standard tires. These steel links are connected by rubber links 2 to form a chain encircling a tire tread, the steel links and rubber links alternating throughout the length of the chain. In assembled relation, the body of every steel link seats in the groove 10 below the normal tread of the tire, while each rubber link lies flat on the tread surface between and connecting adjacent steel links and covering that part of the groove. The tension of the rubber of these links 2 is such as to hold the assembled chain snugly in place and completely offset any centrifugal action during rotation. Likewise, this same tensile elasticity automatically takes up or allows for any reasonable wear. Also, it facilitates application or removal of the device. The overall length of each rubber link, preferably, is about 3½" and the distance between the centers of the holes, perforations or eyes 3 is approximately 2¼". In actual operation it has been found that, on the average automobile, with average load and conditions, that part of the tire of each wheel which is deformed or flattened by engagement with the road surface is between 6" and 8" in length, circumferentially of the tire. This section is flat or straight except for the irregularities of the road surface and is, roughly, tangent to the tire circumference. Since the distance between the centers of the eyes 3 of the rubber links 2 is only 2¼" and the overall length of steel links 1 is 2", it follows that the overall distance measured by any two steel links and the connecting rubber link, is just about 6". Consequently, at least one steel link must be at all times, in this flattened area and in contact with the road surface. If the flattened area is 8" there would be at least two steel links, at all times, in the flattened area. Each end of each steel link is cut off abruptly, providing a sharp corner or edge 4, at right angles to the edge of the link and across its outer face where it would contact the ground or road surface. With a full set or complete circle of these links—alternately steel and rubber—in place on a tire and under normal conditions, the links will simply contact the ground as the wheel revolves. The tread will yield enough to embed the links. But, assume that the brake is applied and forward skidding is about to start. The tendency will be just the same as though the wheel were stationary and the contacting road surface were drawn suddenly rearwardly—just as though you had rubbed the dog's back in the wrong direction. The rearwardly directed forward edges 4 would be ineffective. However, the forwardly directed rear edges 4 would catch and bite into the road. At the same time, by that engagement they would be tipped out radially or projected. The more they are projected the deeper they bite and the deeper they bite the more they are projected. On the other hand, as soon as skidding stops, the resilience or spring of the metal retracts or withdraws them to normal contacting, non-gripping, position. In the case of spinning the opposite is true. In that case, the rearwardly directed forward edges 4 bite in, while the forwardly directed rear edges 4 are ineffective. And, of course, in backward skidding, the same parts come into play and in the same way, as in wheel spinning. The flat bar form of link greatly assists in maintaining proper position of the links with their lateral axes parallel with the wheel diameter. It also provides full length biting or gripping edges across the entire width of the bar. To further assure this relative position, each end of each link is offset laterally, providing a foot 5. These feet are directed oppositely. In a preferred form, the total lateral width of both feet and the link bar is approximately ¾". This, in substance, provides an outer, lateral or horizontal road surface engaging base ¾" wide for a link just about the same vertical measurement. This wide base, of course, contributes greatly toward maintaining the respective link in operative position. The walls of the tire groove 10 and the rubber links contribute their effects toward the same result. Due to these several agencies, every steel link is securely maintained in operative position with its lateral axis substantially parallel with the radius of the wheel. These feet also greatly facilitate assembly, as they are easily threaded through the eyes 3.

The outer or free end of each foot 5 is abrupt and has its surface engaging edge 6 sharpened in the same way and for the same purpose as in the case of edges 4. They function in exactly the same way. In side slipping or skidding at an angle to the intended direction of travel, one or the other of these feet will bite in and hold.

The action or operation of edges 4 and 6 is like that of retractile claws and the terms claw is thoroughly applicable to them, side claw meaning feet 5 and edges 6, while end claw designates the link end and its edge 4.

As is well known, the tread of an inflated tire, when there is no weight on it, is a circle. When it is on an automobile wheel on a road there is a flattened segment of 6" to 8". And for a short distance of about 4½" between each end of the flattened area and the remainder of the circle, there is an easement curvature, one forward and one rearward, where the flattened surface and the circle merge. This is a much sharper curve than that of the tire tread. In use, every link of this invention must be subjected to that sharp curvature twice in every rotation of the wheel, first as it leaves the normal wheel circumference approaching the flattened segment, and second, as it leaves the flattened segment approaching the normal circumference. After repeated tests it has been established that metal links of appreciably greater length than this easement curve, would be bent out of shape across the easement curve as a fulcrum, as one end would enter or leave the flattened section of the tread, the easement curve acting as a fulcrum for the bending. To avoid this and have every link retain, fully, its original shape, the links were shortened to somewhat less than the full length of the easement curvature and their bodies 7 were given a curvature of substantially the same radius as that of the easement curvature. Consequently, all bending or deforming action is completely eliminated, providing perfectly smooth operation.

The rubber links, of course, add an extra cushioning effect for the ends of the steel links in normal travel as they contact the roadway, as clearly shown in Figs. 2 and 3.

Since the whole set of metal links is embedded in the circumferential tire groove 10 and only the claws project a slight distance and since these are relatively widely spaced, all bumping or rough riding, as with tire (cross) chains is completely eliminated. This is clearly shown in Figs. 1 and 3.

Because there is no metal-to-metal contact and because only a very slight part of each metal link contacts the road surface, the device has a long life. In view of the above facts, it is practical and desirable to leave these devices on, through the entire winter season.

Due to the resilience of the steel links and the open link construction, each biting edge 4 and 6, is constantly and effectively projected as it is engaged by the road surface in any road slipping or skidding motion of the automobile relatively to the road. As long as the slipping tendency exists, effective projection is maintained and projection increases in proportion to increased tendency or strain toward slipping. Likewise, as tendency toward slipping decreases, projection decreases. Thus, the anti-skid or biting edges 4 and 6 are, actually, retractile claws automatically projected and retracted to and from operative position just as the claws of a cat, the projection and retraction being effected by rubbing contact between road surface and claws exactly as in stroking a dog's back, movement of the claws 4 or 6 relatively to the road surface, while in biting contact therewith, acting to project them, while movement in the reverse direction acts to retract them, or, at least, to free them to be retracted by the resilience of the link metal.

As further maintaining alinement of the steel links with and in the circumferential groove 10, each connecting rubber link 2 is provided with a centrally disposed longitudinal rib 8 adapted, when the device is in operative position to fit snugly into the tire groove 10 and anchor link 2 in proper position. Extending laterally of each rubber link 2, across the opposite face and at right angles to rib 8, is a shoulder or raised portion 9. As the wheel rotates, this shoulder will contact the roadway and force the rib 8 to snug seating position. Shoulder 9 acts to reseat rib 8 at each turn of the wheel so that it will always be returned to proper position if it should get loose.

The steel links are all alike and the same is true of the rubber links. It is only necessary to connect the proper number to fit the particular tire. A dealer needs only to have a supply of the separate links. Any slight variation in length of chain, making a differential of less than one link length, as for worn tires or other well known reasons, will come well within the total elasticity of all rubber links of the particular chain or assembly. The matter of repairs of any part is obvious. The user has merely to remove the device in usual and well known manner, insert a new link in place of the one removed and reconnect the respective link ends. For such repairs, quickly and easily made, it is only necessary to carry two or three links of each—steel and rubber.

The main fact contributing to the long life of the device is that there are no metal-to-metal contacts, as in standard tire chains. Next in importance contributing to the same end is reduction of contact area when in operation. In this device only a very short part of each end of the link contacts the ground, only the claw or edge and the immediately adjacent link end portion, a very, very small fraction of each link. All the remainder of each steel link is embedded in and protected by the groove walls. Also, the rubber connections completely eliminate all wear between links. Due to each steel link body having the radius of the easement curve, there is no bending, distortion or damaging strain on any of the links. They are completely at rest and strain free throughout use except in the occasional emergencies of skid prevention. Even then, only their tips are under strain to any appreciable extent.

Metal plates may be used in place of the rubber links 2 but, although the device would be operative, there would be serious objections, as hereinabove indicated. This modified form, with metal plate 2' instead of the rubber link 2, is shown in Figures 8 and 9. In that form, the body 7 lies in the groove 10 but the eyes or loops of the steel links lie flat across the tire tread or face, spanning the groove while the metal connecting plate 2' seats in the tread groove, instead of lying across it, as does the rubber link, in the preferred form.

It is thought that the construction, operation and use of the invention will be clear from the preceding detailed description.

It will be well understood that the form and construction of the two kinds of links may be varied within considerable limits without in any degree departing from the field of the invention and it is meant to include all such within this application, wherein only one preferred form and a single modification have been shown, purely as an illustration and with no thought or intention of in any degree limiting, thereby, the scope of the appended claims.

Having thus described my invention, what I claim and desire to protect by Letters Patent is:

1. An antiskid device for wheel tires comprising a plurality of circumferentially disposable chain links of resilient metal and of generally elliptical form having one side concaved with an opening through the opposite side and adapted to be connected to similar links for removably mounting in the circumferential groove of a tire tread, said links each being provided with surface gripping claws on their free ends and retractable relatively to the road surface due to the resilience of the links, and elastic members alternating with said links and connecting the same in a continuous chain, said elastic members being arranged to overlie the aforesaid groove and being provided with ribs seating in said groove to assist in maintaining said device in operative position.

2. In combination, a wheel tire provided with a circumferential groove, and an antiskid device carried thereby and comprising a plurality of chain links of resilient metal of generally elliptical form having one side concaved and with an opening through the opposite side, and surface gripping claws terminating their free ends and retractable relatively to the road surface due to said resiliency, said links being disposed longitudinally circumferentially in said groove and elastic members connecting said links in place about said tire.

3. In combination a wheel tire provided with a circumferential groove, and an antiskid device carried thereby and comprising a plurality of chain links of resilient metal of generally elliptical form with one side concaved and an opening through the opposite side and retractile claws terminating their free ends, said links being disposed longitudinally circumferentially in said groove and members connecting said links in place about said tire, said members overlying said groove and being provided with ribs extending into said groove to maintain said antiskid device in position.

HARRY R. ANSEL.